US006268670B1

(12) United States Patent
Kuragaki et al.

(10) Patent No.: US 6,268,670 B1
(45) Date of Patent: Jul. 31, 2001

(54) STARTER

(75) Inventors: Akira Kuragaki; Shigeru Shiroyama; Koichiro Kamei; Motoi Hisamoto; Takehiro Kobayashi; Hidekazu Katayama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/534,041

(22) Filed: Mar. 24, 2000

(30) Foreign Application Priority Data

Oct. 13, 1999 (JP) ................................................ 11-291340

(51) Int. Cl.[7] ............................ H02K 7/10; F02N 11/08; F02N 15/02

(52) U.S. Cl. ........................................... 310/75 R; 74/7 A

(58) Field of Search ................................. 310/89, 42, 91, 310/67 R, 83, 238, 239; 74/6, 7 R, 7 A–7 E, 8, 9; 290/38 R, 48, 38 A, 38 B, 38 C

(56) References Cited

U.S. PATENT DOCUMENTS 4,945,777 * 8/1990 Isozumi .................................. 74/7 E
5,099,703 * 3/1992 Isozumi ...................................... 74/6
5,154,089 * 10/1992 Konishi ................................. 74/7 E
5,154,090 * 10/1992 Konishi ................................. 74/7 E
5,684,334 * 11/1997 Zenmei et al. ..................... 290/38 R
5,818,118 * 10/1998 Kimura et al. ......................... 290/48
5,839,318 * 11/1998 Kimura et al. ......................... 74/7 R
5,901,604 * 5/1999 Sato et al. .............................. 74/7 A

FOREIGN PATENT DOCUMENTS 9-195902 7/1997 (JP) ................................ F02N/15/02
11-117839 4/1999 (JP) ................................ F02N/11/08

* cited by examiner

*Primary Examiner*—Tran Nguyen
(74) *Attorney, Agent, or Firm*—Sughrue, Mion, Zinn, Macpeak & Seas, PLLC

(57) ABSTRACT

To prevent damage or breakage of a pinion return coil spring employed in a starter, it is held between a first stopper and a second stopper which are coaxially arranged relative to an output shaft. Each stopper is provided with a cylindrical portion for restricting an inner diameter of the pinion return coil spring and controlling the movement of the pinion.

7 Claims, 9 Drawing Sheets

STARTER

BACKGROUND OF THE INVENTION

1. Field of the Invention

2. Description of the Prior Art

As shown in FIG. 8, a starter (a coaxial type starter) is known, in which an solenoid switch 200, an overrunning clutch 300 with a pinion 30P adapted to engage with a ring gear 500, a plunger (a movable iron-core) and the like are coaxially arranged relative to an output shaft 100.

This type of starter operates as shown below.

That is, when current flows to an exciting coil of the solenoid switch 200, the plunger is attracted to a core of the solenoid switch. After a little when the plunger is attracted and starts to move, a movable contact contacts a stationary contact and electric power is supplied to a DC motor and the output shaft 100 is turned via a shaft (a motor shaft), a reduction mechanism and the like. Then, the overrunning clutch 300, which is spline-connected to the output shaft 100, moves toward the ring gear 500, and the pinion 30P meshes with the ring gear 500 and an engine is started.

In a starter as shown in FIG. 8, a pinion return coil spring 510 is arranged coaxially relative to the output shaft. This pinion return coil spring 510 is compressed when the pinion 30P is moved in the direction to mesh with the ring gear 500 and gives the depressing force to the end of the pinion 30P to return the pinion 30P to the original position when power is no longer applied to the exciting coil. Namely, the pinion return coil spring 510 is held in the axial direction between a washer 520 provided in front of the pinion 30P and a rear end surface 530*e* of a stopper 530 mounted to protect the pinion 30P from moving in the forward direction of the starter by a stop ring 540.

In a starter disclosed in Japanese Laid-Open Patent Application No. Hei 9-195902, the pinion return coil spring 510 is held in the axial direction between the pinion 30P and a collar 550 mounted to prevent the pinion 30P from moving in the forward direction of the starter by the stop ring 540.

The pinion return coil spring 510 uses generally a spring that is made of such a material as a piano wire, etc. and has the section in almost circular shape.

In the conventional starter shown in FIG. 8, the pinion return coil spring 510 is simply held in the axial direction between the washer 520 and the stopper 530. In a conventional starter shown in FIG. 9, the pinion return coil spring 510 is also simply held in the axial direction between the top surface of the pinion 30P and the collar 550. In this structure, the pinion return coil spring became eccentric in the radial direction, interfered with the output shaft 100, was shaved and damaged in some cases.

Further, in FIG. 8, when an engine is started and the ring gear 500 drives the pinion 30P, that is, in the overrun state, relative rotation is produced between the pinion 30P and the output shaft 100. However, if sliding between the washer 520 and the pinion 30P is not effected and three of them including the pinion return coil spring 510 rotate together, the other end of the pinion return coil spring 510 and the stopper 530 also rotate together with relative rotation. When the winding direction (the clockwise or counterclockwise winding) of the pinion return coil spring 510 is the same direction as that of the pinion 30P, the pinion return coil spring 510 might be rolled in the inner peripheral side and could be broken in the worst case. Further, in FIG. 9, when the direction of winding of the pinion return coil spring 510A is the same direction as that of rotation of the pinion 30P, sliding between the pinion 30P and the pinion return coil spring 510 is not effected and they rotate together, the same problem as seen in FIG. 8 will be produced.

In FIG. 8, when the winding direction of the pinion return coil spring 510 and the rotating direction of the pinion 30P differ, the pinion return coil spring 510 is expanded to the outer portion by centrifugal force or the washer 520 is caught by the end of the pinion return coil spring 510 and tries to unwind the spring (in FIG. 9, the top surface of the pinion 30P is caught by the end of the pinion return coil spring 510) and therefore, the pinion return coil spring 510 might be broken by centrifugal force applied to it in the worst case.

Further, in FIG. 8, when the portion between the washer 520 and the pinion 30P is rusted, the movement of the pinion return coil spring 510 becomes further worse and the probability of the breakage of the pinion return coil spring 510 becomes very high. In FIG. 9, the same also applies if the portion between the pinion return coil spring 510 and the pinion 30P is rusted.

SUMMARY OF THE INVENTION

It is therefore an object of the present invention to solve the above-mentioned problems and provide a starter that can prevent damage or breakage of a pinion return coil spring.

In a starter according to the present invention, a pinion return coil spring is held between a first stopper that is arranged coaxially relative to an output shaft and slides in the axial direction so as to contact the top end of a pinion and a second stopper arranged coaxially relative to the output shaft at a fixed position of the top end of the output shaft, wherein each stopper is provided with a region for restricting the inner diameter side of the pinion return coil spring and controlling the movement of the pinion.

Each stopper is also provided at its periphery with a region for restricting the outer diameter of the closely wound portion of the pinion return coil spring at its both ends.

Also, one end of the pinion return coil spring that is held by the second stopper is arranged to situate on the forward side of the starter beyond the position of the stop ring.

Furthermore, the pinion return coil spring is used, the direction of winding of which is the same as that of rotation of the pinion, and the cross section of the spring material of which is formed in the long shape in the outer diameter direction thereof.

The first stopper is made of sintered material impregnated with lubricating oil.

The pinion return coil spring is made of rust resisting material.

The above and other objects, features and advantages of the present invention will become more apparent from the following description when taken in conjunction with the accompanying drawings.

DESCRIPTION OF THE PREFERRED EMBODIMENT

Embodiment 1

Figure 1:
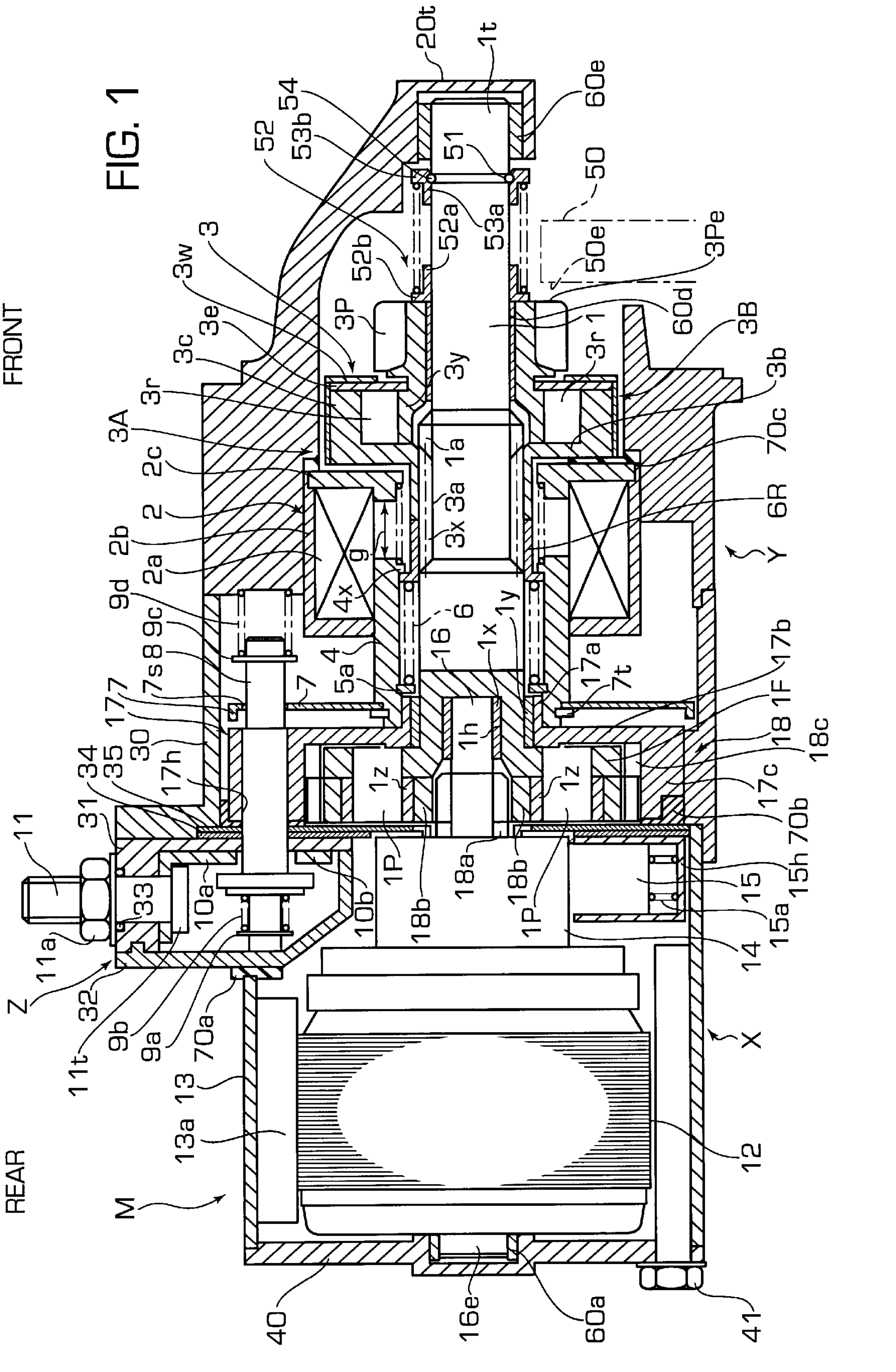
FIG. 1 is a sectional view showing the entire structure of a starter according to an embodiment 1 of the present invention.

Hereinafter, a starter according to an embodiment 1 of the present invention will be explained with reference to FIG. 1. FIG. 1 is a sectional view showing the structure of the starter according to the embodiment 1. In FIG. 1, the left side portion is a DC motor portion X, the right side portion is a operating portion Y, and the almost upper central portion is a contact chamber Z. Hereinafter, the motor side is called the rear and the ring gear side is called the front.

The starter of the present invention features mainly the structure to hold the pinion return coil spring, etc. Before explaining this structure and the like, the entire structure of the starter will be first explained.

The starter according to the embodiment 1 is covered with a front bracket 20, a center bracket 30 and a rear bracket 40, all of which are the external wall members, and presents an almost shell shape appearance. Further, the part into which a ring gear 50 goes is an open portion.

In the inside of the starter, a DC motor M, an output shaft 1 that is driven by this DC motor M and around this output shaft 1, a ring-shaped solenoid switch 2, an overrunning clutch 3, a plunger (a movable iron core) 4 and the like are arranged.

That is, the starter according to the embodiment 1 is a coaxial type starter with the solenoid switch 2, the overrunning clutch 3 and the plunger 4 arranged coaxially to the output shaft 1.

As well known, the DC motor M comprises an armature 12, a yoke 13 covering around this armature 12, a stationary magnetic pole 13*a* provided in the inside of this yoke 13, a commutator 14, brushes 15, a shaft 16 and the like. The armature 12 comprises an armature core with an armature coil wound around, and the front side of its shaft 16 is connected to a reduction mechanism 18 after penetrating a cylindrical space of the cylindrical commutator 14.

The armature coil is connected to the commutator 14. The DC motor M is available in 2-pole, 4-pole and 6-pole motors according to the number of stationary magnetic poles. When, for instance, a 6-pole DC motor is used, total 6 stationary magnetic poles 13*a* including N-pole and S-pole arranged alternately, and brushes 15 contacting the commutator 14 are arranged along the circumference of the commutator 14.

Further, 15*a* is a spring to press the brushes 15 against the commutator 14 and 15*h* is a brush holder.

The output shaft 1 is driven with the DC motor as described above.

The operating portion Y comprises the reduction mechanism 18, the output shaft 1, the solenoid switch 2, the overrunning clutch 3 and the plunger 4. 17 is an inner gear member. This inner gear member 17 is composed of a first cylindrical portion 17*a* which is press fit to the outer portion of the output shaft 1 via a bearing 1*y*, a hollow disc shape bottom plate portion 17*b* extending in the right angle direction to the outer portion of the output shaft 1 from the first cylindrical portion 17*a*, and a second cylindrical portion 17*c* having an inner gear 18*c* on the inner portion, extending to the rear side from the edge of the outer portion of the bottom plate portion 17*b*.

The reduction mechanism 18 is composed of the inner gear 18*c* of the inner gear member 17, a sun gear 18*a* provided to the shaft 16, plural planet gears arranged around the sun gear 18*a*, plural planet gears 18*b* engaging with the sun gear 18*a* and the inner gear 18*c*, and pins 1P which are protruding from a flange portion 1F of the output shaft 1 inserted between a group of the planet gears 18*b* and a bottom plate portion 17*b* and connect the planet gears 18*b* to the flange portion 1F of the output shaft 1. The turning force of the planet gears 18*b* is transmitted to each pin 1P via bearings 1*z*.

There is a round groove 1*h* formed at the center of the flange portion 1F of the output shaft 1, and the forward side end of the shaft 16 is rotatably supported via a bearing 1*x* provided in the round groove 1*h*.

Accordingly, when the planet gears 18*b* turn around the sun gear 18*a*, the turning force of the shaft 1 is decelerated and transmitted to the output shaft 1 via the pins 1P.

On a part of the outer portion at the central side of the output shaft 1, a helical spline 1*a* is formed. On the outer portion where the helical spline 1*a* is formed, an overrunning clutch 3 is arranged so that the cylindrical portion 3*a* of a thrust spline 3A corresponds thereto. On the inner surface of the cylindrical portion 3*a* of the thrust spline 3A, a helical spline 3*x* is formed to engage with the helical spline 1*a*. That is, the overrunning clutch 3 is spline-connected to the output shaft 1.

Further, the solenoid switch 2 is arranged at the outer portion of the cylindrical portion 3*a* of the thrust spline 3A.

In addition, the plunger 4 is arranged on the outer portion at the flange 1F side of the output shaft 1.

The overrunning clutch 3 is composed of the thrust spline 3A comprising a cylindrical portion 3*a* with the helical spline 3*x* formed on the inner surface to engage with the helical spline 1*a* formed on a part of the outer portion at the central side of the output shaft 1, a roller cam 3*c*, and a flange portion 3*b* that becomes the cam bottom of the roller cam 3*c*, an inner clutch 3*y* comprising a washer 3*e*, a pinion 3P and the base cylindrical portion of the pinion 3P, a clutch roller 3*r* and a spring 3*s* arranged in a groove 3*t* formed on the roller cam 3*c*, and a clutch cover 3*w* covering the outside of the flange portion 3*b* of the thrust spline 3A, the roller cam 3*c* and the washer 3*e*.

Figure 6:
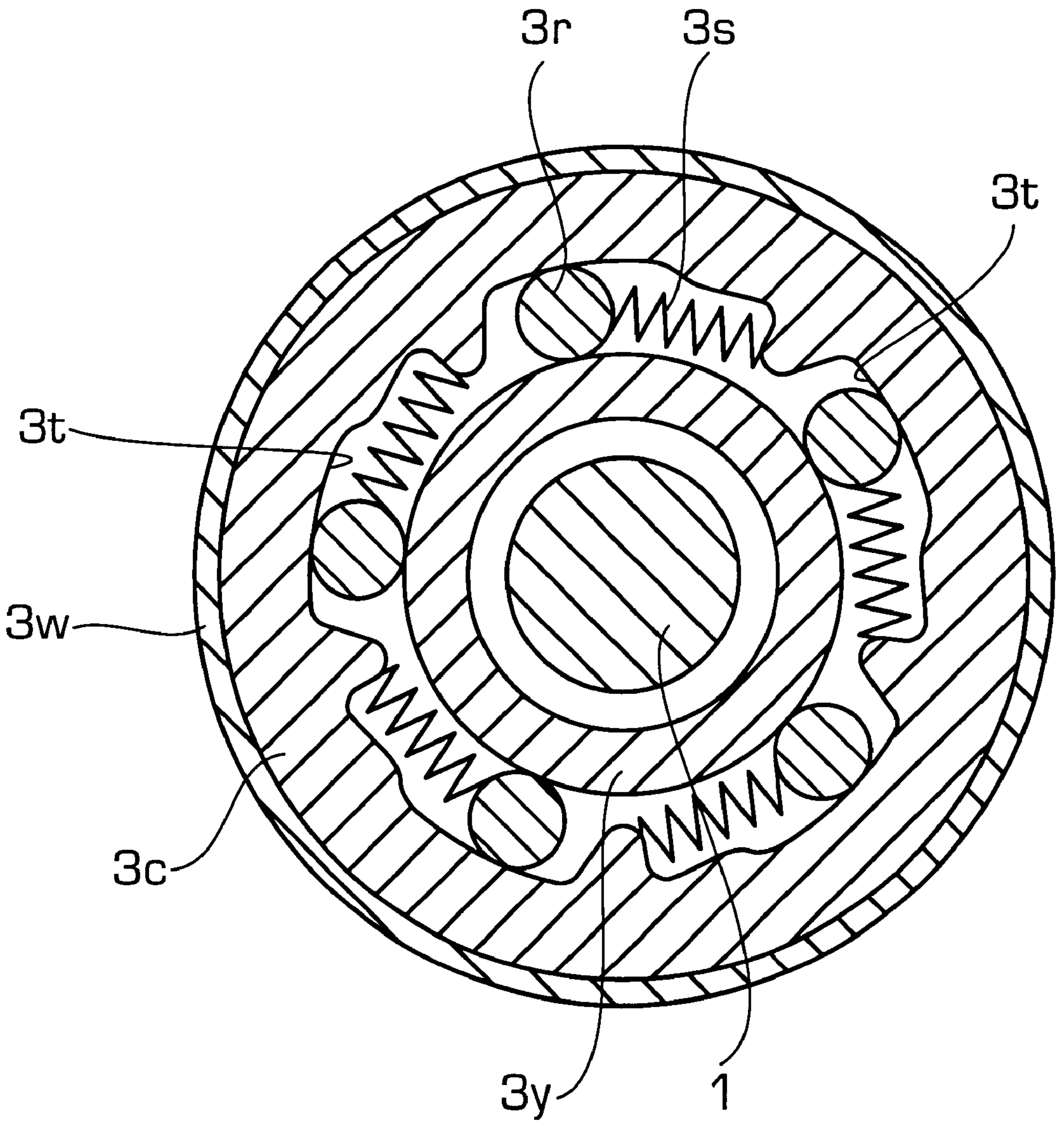
FIG. 6 is a sectional view of an overrunning clutch.
Figure 7:
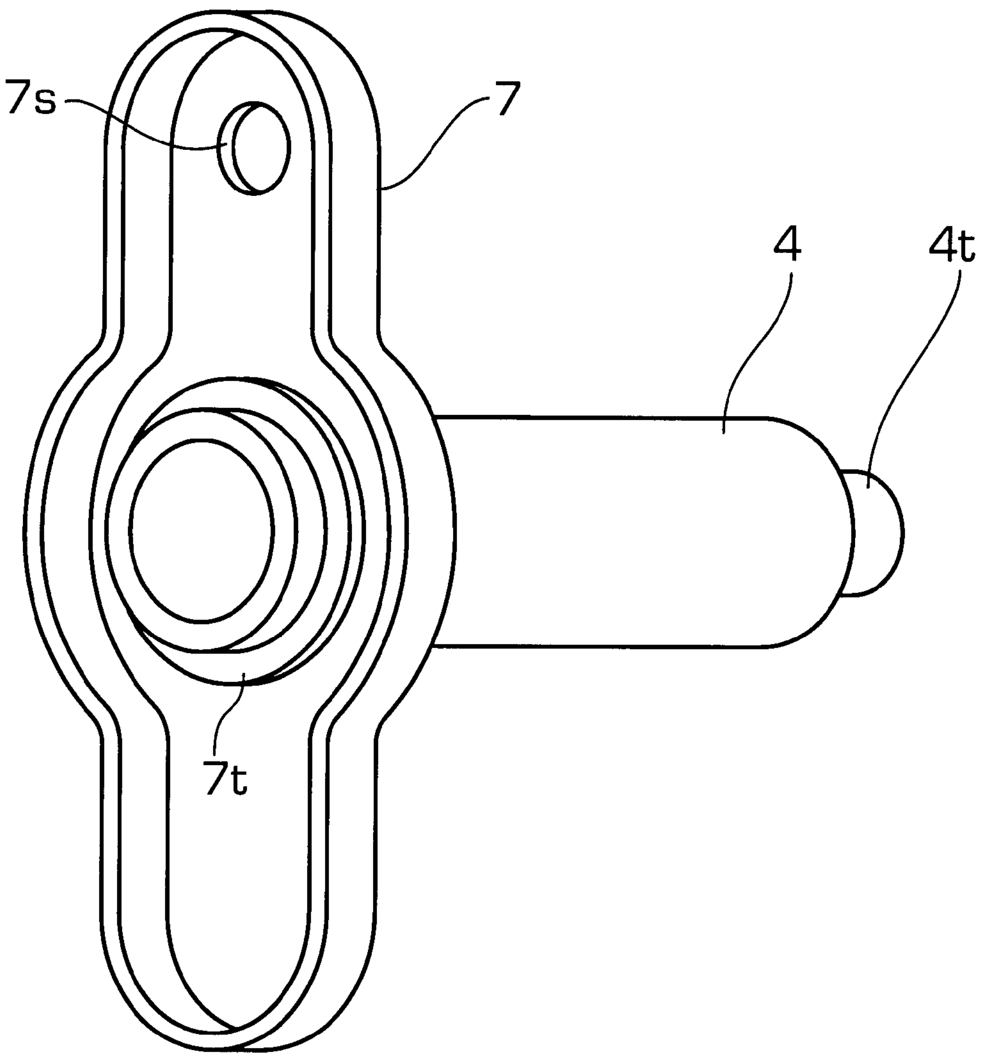
FIG. 7 is a perspective view of a plunger and shift plate.
Figure 8:
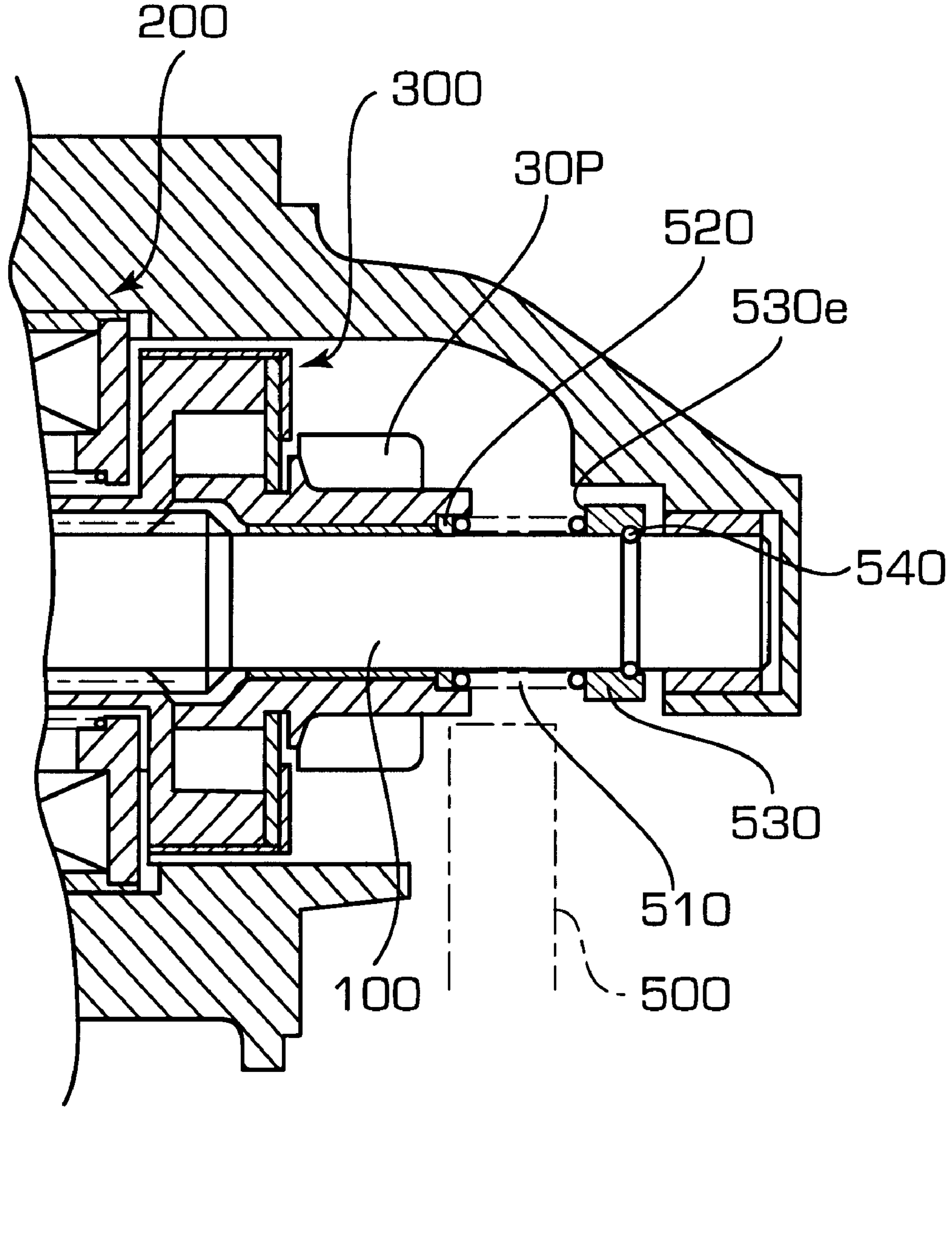
FIG. 8 PRIOR ART
FIG. 8 is a partial sectional view showing an example of a conventional starter.
Figure 9:
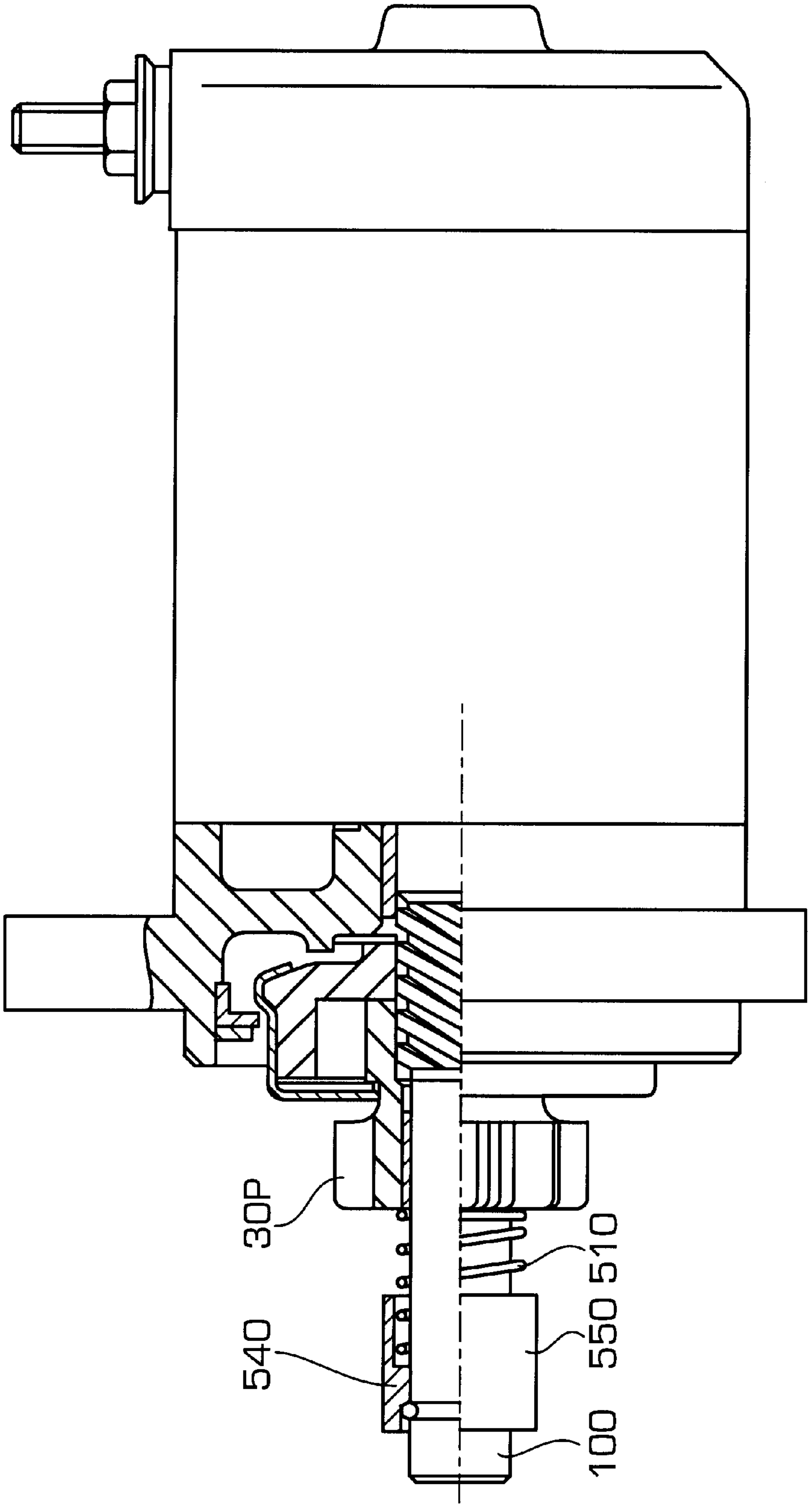
FIG. 9 PRIOR ART
FIG. 9 is a partial sectional view showing an example of a conventional starter.

The overrunning clutch 3 acts as a so-called one-way clutch. Further, a sectional view of the overrunning clutch 3 is shown in FIG. 6. At several points of the inner portion of the roller cam 3*c*, the grooves 3*t* are formed to provide narrow and wide spaces between the outer portion of the inner clutch 3*y*, and a clutch roller 3*r* is arranged in each of these grooves 3*t*. 3*s* is a spring to press the clutch roller 3*r* to the narrow space of the groove 3*t*.

When the output shaft 1 is driven by the DC motor M, the roller cam 3*c* rotates, the clutch roller 3*r* moves to the narrow space of the groove 3*t*, the roller cam 3*c* engage with the inner clutch 3*y*, the pinion 3P turns and engages with a ring gear 50. Then, when the pinion 3P is turned by the ring gear 50, the clutch roller 3*r* moves to the wide space of the groove 3*t*, the roller cam 3*c* and the inner clutch 3*y* are disengaged, and the overrunning clutch 3 is separated from an engine.

The solenoid switch 2 is composed of an exciting coil 2*a*, a switch case 2*b* covering the exciting coil 2*a* and a core 2*c*, and is arranged at the rear from the position of the overrunning clutch 3. The core 2*c* has a hollow shaped disc surface opposing to the flange portion 3*b* of the thrust spline 3A and is composed of a ring-shaped body penetrating the outer portion of the cylindrical portion 3*a* of the thrust spline 3A and arranged thereon, and has a ring-shaped protruding portion 2*t* extending to the rear at the cylindrical portion 3*a* side of the thrust spline 3A.

The plunger 4 is composed of a cylindrical body arranged movably between the inner portion of the switch case 2*b* and the cylindrical portion 3*a* of the thrust spline 3A.

Further, in order to reduce magnetic flux leaking to the output shaft 1 from the plunger 4, the starter is constructed as shown below. That is, the overrunning clutch 3 is so arranged that in the state wherein the plunger 4 is not excited by the exciting coil 2*a*, one end 3*f* of the cylindrical portion 3*a* of he thrust spline 3A is positioned between the ring shaped protruding portion 2*t* of the core 2*c* and the top end of 4*t* of the opposing plunger 4 at a specified gap g. Then, the outer portion of the output shaft 1 corresponding to the specified gap g is covered with the cylindrical portion 5 formed with a non-magnetic material or a low magnetic permeable material.

At the end 4*t* of the plunger 4, a first engaging portion 4*x* protruding in the direction of the output shaft 1 is formed and at the other end side of the cylindrical body 5, a second engaging portion 5*x* to engage with the first engaging portion 4*x* is formed.

Therefore, the cylindrical body 5 is so arranged that its one end 5*f* is kept in contact with one end 3*f* of the thrust spline 3A and the other end is kept engaged with the first engaging portion 4*x* by the second engaging portion 5*x*.

Further, on the inner portion of the rear end of the plunger 4, a ring shaped plate 5*a* is fixed. Between the inner portion of the plunger 4 and the outer portion of the output shaft 1 and between the plate 5*a* and the second engaging portion 5*x* of the cylindrical body 5, the coil spring 6 is arranged. This plate 5*a* functions as a pressure plate to transmit the resilient force accumulated in the coil spring 6 to the overrunning clutch 3 via the cylindrical body 5 and engage the pinion 3P with the ring gear 50.

Further, the cylindrical body 5 functions as a member to transmit the resilient force accumulated in the coil spring 6 to the overrunning clutch 3, that is, to give the depressing pressure to the overrunning clutch 3.

Accordingly, the plunger 4 is attracted by the core 2*c* and moves in the direction (forward) to the core 2*c*, the overrunning clutch 3 is moved as pushed by the cylindrical body 5, which transmits the depressing pressure of the plate 5*a* and the coil spring 6 with the movement of the plunger 4, and after the end surface 3P*e* of the pinion 3P contacts the end surface 50*e* of the ring gear 50 and once stops to move, when the DC motor M is driven and the crest of the pinion 3P fits the bottom of the ring gear 50, the pinion 3P is engaged with the ring gear 50 by the resilient force of the coil spring 6 so far accumulated.

Further, a coil spring 6R to return the plunger 4 to the original position when power is no longer applied to the exciting coil 2*a* is arranged coaxially to the output shaft 1 at the position between the inner portion of the ring shaped protruding portion 2*t* of the exciting coil 2*a* and the first engaging portion 4*x* of the end 4*t* of the plunger 4. In other words, the coil spring 6R is arranged coaxially relative to the output shaft 1 on the outer periphery of the cylindrical body 5 as a member to give the depressing pressure to the overrunning clutch 3 so that it is put between the plunger 4 and the core 2*c*.

8 is a contact shaft. This contact shaft 8 is supported movable in the extending direction of the shaft by a supporting hole 17*h* provided at a part (at the upper part in FIG. 1) of a second cylindrical portion 17*c* of the inner gear member 17. Further, the contact shaft 8 is mounted so as to straddle the operating portion Y and the contact chamber Z via the supporting hole 17*h*.

At one end of the contact shaft 8 located in the contact chamber Z, a movable contact 8*e* is provided. At the rear side from this movable contact 8*e*, a ring shape plate 9*a* is fixed to the contact shaft 8 and between this plate 9*a* and the movable contact 8*e*, there is provided a coil spring 9*b* to depress the movable contact 8*e* against the stationary contact, which will be described later. Further, at the other end of the contact shaft positioned at the operating portion Y side of the contact shaft 8, a ring shape plate 9*c* is fixed to the contact shaft 8, and between this plate 9*c* and a front bracket 20, a return coil spring 9*d* is provided.

Further, at the rear end of the plunger 4, the shift plate 7 is mounted. This shift plate 7 is a narrow strip plate extending vertically. At the central side of this plate, a hole is provided to mount the plate at the rear end side of the plunger 4 and at the upper part corresponding to the contact shaft 8, a through hole 7*s* is formed. This shift plate 7 is fixed to the plunger 4 with an engaging ring 7*t*.

The motor portion X, the contact chamber Z and the operating portion Y are divided by a partition plates 34, 35.

Further, the contact chamber Z is divided with a contact chamber wall 31 and a contact chamber cover 32. On the contact chamber wall 31, a first stationary contact 10*a* and a second stationary contact 10*b* are provided.

The first stationary contact 10*a* is connected to a battery via a terminal bolt 11. The second stationary contact 10*b* is connected to a positive pole brush via a lead wire and also, connected to the other end of the exciting coil 2*a* of the solenoid switch 2.

The first stationary contact 10*a* is fixed to the contact chamber wall 31 with a head portion lit of the terminal bolt 11 as the terminal bolt 11 is fixed with a nut 11*a*.

Further, 33 is an O-ring and 70*a*, 70*b* and 70*c* are a packing.

A rear end 16*e* of the shaft 16 is rotatably supported by a rear bracket 40 via a bearing 60*a* and the forward end 1*t* of the output shaft 1 is supported at the end 20*t* side of the front bracket 20 via a bearing 60*e*.

41 is a bolt to fix the DC motor portion X and the operating portion Y by putting them between the rear bracket 40 and the front bracket 20.

Next, a pinion return coil spring holding structure that is a feature of the present invention will be explained.

51 is a pinion return coil spring. This spring is compressed when the pinion 3P moves in the direction to mesh with a ring gear 50 and returns the pinion 3P to the original position by giving a depressing force to the end of the pinion when power is no longer applied to the exciting coil 2*a*. This spring is held between a first stopper 52 which is mounted coaxially to the output shaft 1 so as to contact the end of the pinion 3P and a second stopper 53 which is coaxially mounted to the output shaft 1 at the end side of it.

The stoppers 52, 53 have cylindrical portions 52*a*, 53*a* in inner diameters slightly larger than the diameter of the output shaft 1 and flange portions 52*b*, 53*b* formed protruding in the outer direction at one end of the cylindrical portions 52*a*, 53*a*, respectively. The first stopper 52 is arranged so as to contact the end of the pinion 3P and is able to slide in the axial direction. The second stopper 53 is so arranged that its side without the flange portion 53*b* provided faces the end of the pinion 3P and is not moved in the forward direction of the starter by a stop ring 54 fixed to the output shaft 1. The pinion return coil spring 51 is arranged at the outer portion of the cylindrical portion 52*a*, 53*a* of the stoppers 52, 53 and held in the state it is put between the backs of the flange portions 52*b*, 53*b*, respectively.

The cylindrical portions 52*a*, 53*a* of the stoppers 52, 53 function as the regions to restrict the inner diameter of the pinion return coil spring 51 and control the movement of the pinion 3P.

Further, both ends of the pinion return coil spring 51 are the close wound portions having the close spring pitch. That is, both ends of the pinion return coil spring 51 are formed in parallel with the backs of the flange portions 52*b*, 53*b* so that both ends are closely fit to the backs and hardly come off therefrom.

Next, the operation will be explained.

When the ignition switch is turned ON and current flows to the exciting coil 2*a* of the solenoid switch 2, the plunger 4 is attracted toward the core 2*c* side. Then, the cylindrical body 5 depresses the thrust spline 3A and pushes the overrunning clutch 3 toward the ring gear 50. As a result, the end surface 3Pe of the pinion 3P provided to the overrunning clutch 3 contacts the end surface 50*e* of the ring gear 50 and the overrunning clutch 3 once stops to move forward. However, while slackening the coil spring 6 by the cylindrical body 5, the plunger 4 is further attracted and moves continuously. Then, the shift plate 7 also moves forward and contacts the plate 9*c*. After this state, the plunger 4 is still attracted continuously and therefore, the plate 9*c* fixed to the contact shaft 8 also moves forward. Then, when the movable contact 8*e* of the contact shaft 8 contacts the first and second stationary contacts 10*a*, 10*b*, power is supplied from a battery and the armature 12 begins to turn.

Further, the contact shaft 8 moves continuously until the plunger 4 is completely attracted and its end 4*t* comes to contact the core 2*c*. At this time, the coil spring 9*b* is compressed by the plate 9*a* and the movable contact 8*e* is depressed and kept in contact with the first and second stationary contacts 10*a*, 10*b*.

When the armature 12 begins to turn, its turning force is reduced by the reduction mechanism 18 and transmitted to the output shaft 1, the overrunning clutch 3 which is spline connected to the output shaft 1 and further to the pinion 3P. Then, when the pinion 3P turns slowly and the tooth crests and roots of the pinion 3P agree with those of the ring gear 50, the pinion 3P is pushed forward by the spring force (the resilient force) of the slackened coil spring 6 and meshes with the ring gear 50 completely. As a result, the crankshaft connected to the ring gear 50 turns and an engine is started.

When the pinion 3P is driving the ring gear 50, the number of revolutions of the overrunning clutch 3 which is spline connected to the output shaft 1 is the same as that of the opinion 3P. However, when the engine is ignited and the ring gear comes to drive the pinion 3P, the pinion 3P is disengaged from the overrunning clutch 3 by the overrun mechanism and the pinion 3P turns at a high speed, and a relative rotation is generated.

When the engine starts and the ignition switch is turned OFF, the electromotive force being generated by the exciting coil 2*a* becomes no longer available and the plunger 4 so far kept attracted to the core 2*c* is returned to the reduction mechanism 18 side by the spring force of the coil spring 6R. At the same time, the overrunning clutch 3 and the pinion 3P are also returned to the rear through the first stopper 52 by the spring force of the pinion return coil 51.

According to this embodiment 1, as the inner diameter side of the pinion return coil spring 51 is restricted by the cylindrical portions 52*a*, 53*a* of the stoppers 52, 53, the pinion return coil spring 51 is prevented from becoming eccentric, the inner portion of the pinion return coil spring 51 no longer interferes with the output shaft 1 and the damage of the pinion return coil spring 51 can be prevented.

Further, in the overrun state when using the pinion return coil spring 51 having the same winding direction as the rotating direction of the pinion 3P, the pinion return coil spring 51 is not rolled in the inner portion and can be prevented from being broken.

The moving distance of the pinion 3P of the starter is predetermined according to its type. Further, the pinion return coil spring 51 can be damaged when loaded in the completely compressed state. Therefore, in order to prevent the pinion 3P from moving beyond a predetermined moving distance and the pinion return coil spring 51 from being compressed completely, the length in the axial direction of the cylindrical portions 52*a*, 53*a* are set up. Thus, the moving distance of the pinion 3P can be controlled and the damage of the pinion return coil spring 51 can be prevented.

Embodiment 2

Figure 2:
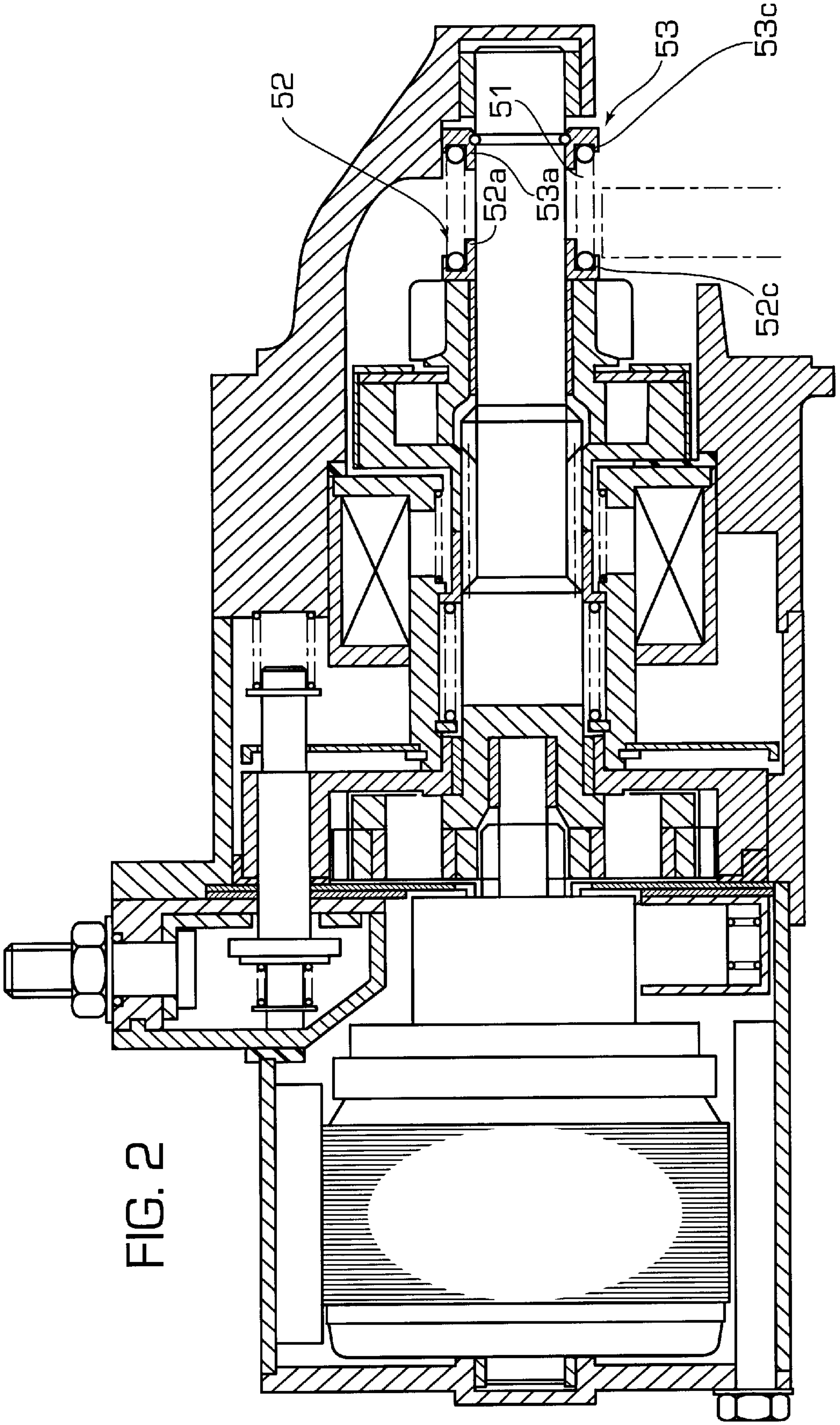
FIG. 2 is a sectional view showing the entire structure of the starter according to an embodiment 2.

As shown in FIG. 2, at the outer portions of the flanges 52*b*, 53*b* of the stoppers 52, 53 in the embodiment 1, the cylindrical portions 52*c*, 53*c* extending in the same direction of the cylindrical portions 52*a*, 53*a* are provided. That is, when the cylindrical portions 52*c*, 53*c* are provided as the regions to restrict the outer diameter of the closely wound portions at both ends of the pinion return coil spring 51, the effects shown below can be obtained in addition to the effects of the embodiment 1 shown in FIG. 1.

That is, even in the overrun state when using the pinion return coil spring 51 having the winding direction differing from the rotating direction of the pinion 3P, the outer diameters of the closely wound portions at both ends of the pinion return coil spring 51 are restricted by the cylindrical portions 52*c*, 53*c*, the extension of the pinion return coil spring 51 to the outer portion by the centrifugal force and the breakage of it can be prevented.

Embodiment 3

Figure 3:
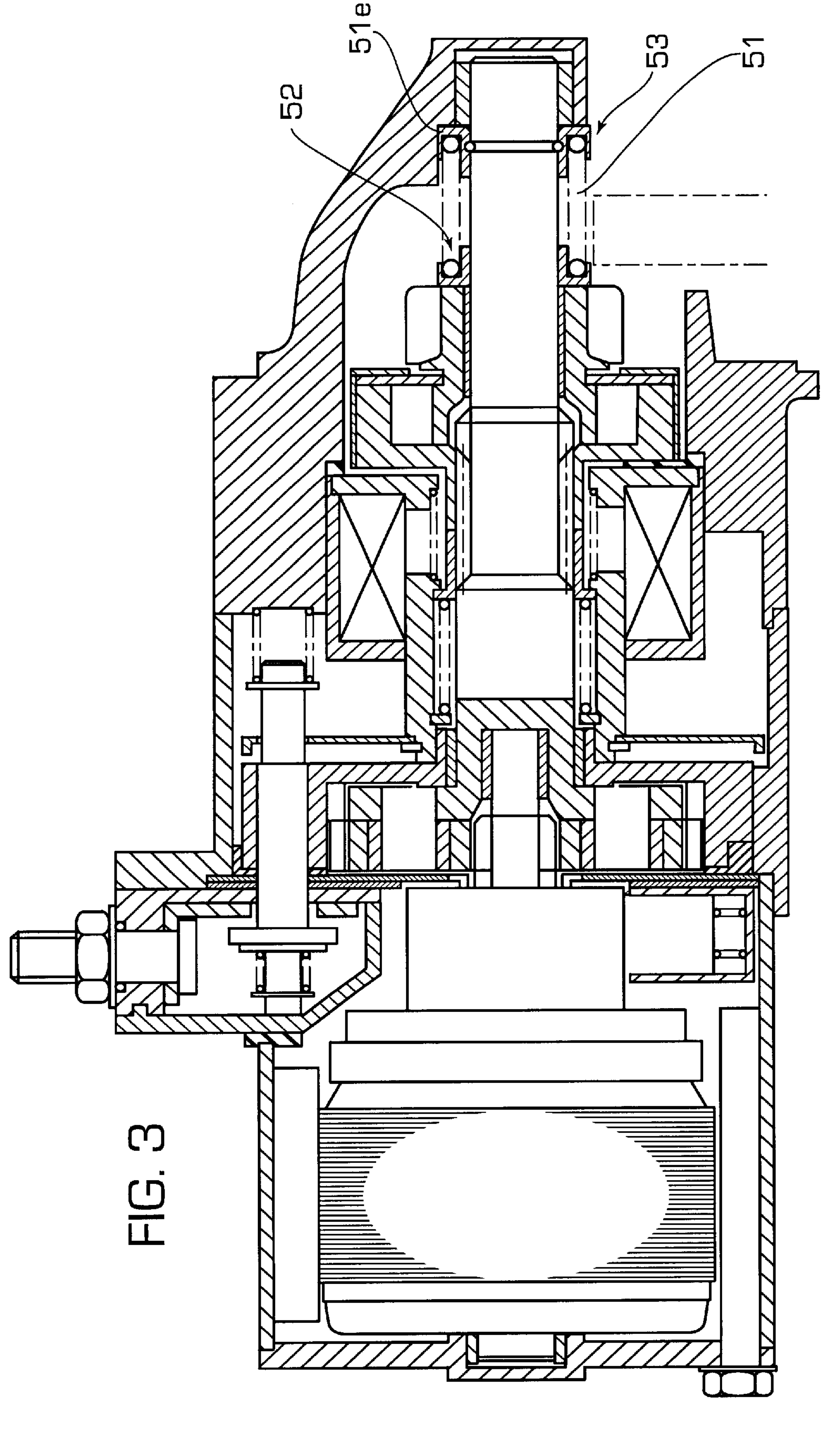
FIG. 3 is a sectional view showing the entire structure of the starter according to an embodiment 3.
Figure 4:
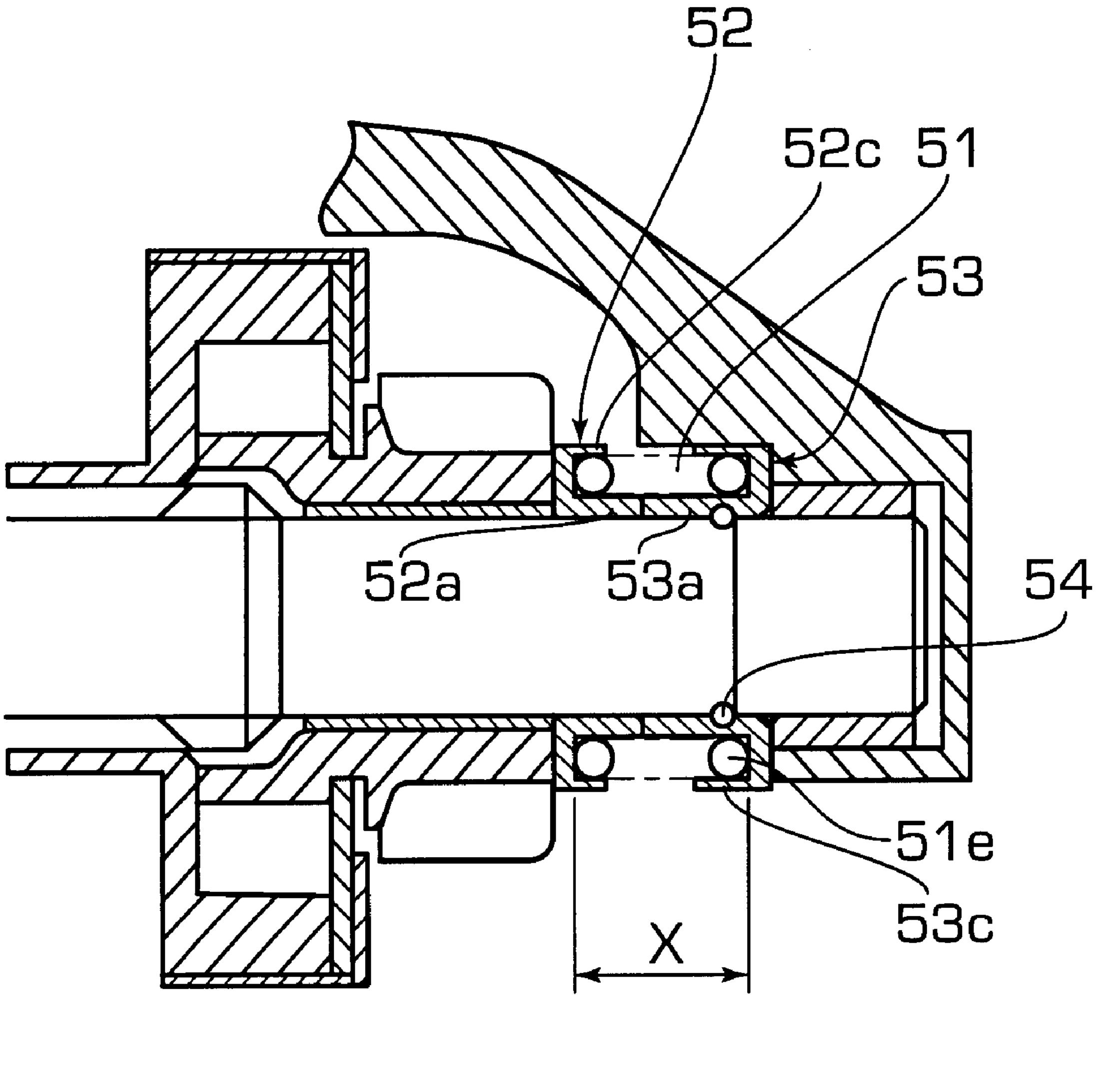
FIG. 4 is a partial sectional view of the starter according to the embodiment 3.

The specification of the pinion return coil spring 51 should be determined so that the length of it when compressed falls in a distance X in the state where the ends of the cylindrical portions 52*a*, 53*a* of the stoppers 52, 53 are butted each other. Accordingly, when the second stopper 53 is so constructed that one end 51*e* of the pinion return coil spring 51 that is held by the second stopper 53 is positioned in front of the starter beyond the stop ring 54 as shown in FIGS. 3 and 4, the degree of designing freedom of the pinion return coil spring 51 can be improved. In particular, when compared with the embodiments 1 and 2, it is possible to give an allowance to the moving distance X of the pinion return coil spring 51 when compressed so as to butt both ends of the cylindrical portions 52*a*, 53*a* of the stoppers 52, 53 and therefore, the degree of designing freedom can be improved and the strength of the pinion return coil spring 51 when compressed can be intensified and therefore, the damage of the pinion return coil spring 51 when loaded in the compressed state can be minimized.

Embodiment 4

As in the embodiment 2, in the overrun state when using the pinion return coil spring 51 having the winding direction differing from the rotating direction of the pinion 3P, if the sliding between the pinion 3P and the first stopper 52 is worse, the pinion return coil spring 51 is subject to centrifugal force as the first topper 52 of the pinion return coil spring 51 turns at a high speed and the first stopper 52 tries to wind back the end of the pinion return coil spring 51. Accordingly, the pinion return coil spring 51 is subject to a large centrifugal force and can be broken. To prevent such the situation, if the pinion return coil spring 51 wound in the same direction as the rotating direction of the pinion 3P is used, no centrifugal force is applied to the pinion return coil spring 51 even if the pinion 3P is turning at a high speed by inertia (the centrifugal force is applied only when the pinion return coil spring 51 wound in the direction differing from the rotating direction of the pinion 3P is used). So, it becomes possible to prevent the breakage of the pinion return coil spring 51 that is attributable to the centrifugal force applied.

Therefore, in the embodiment 2, when the pinion return coil spring 51 wound in the same direction as the rotating direction of the pinion 3P as shown in this embodiment 4 is used, no centrifugal force is applied to the pinion return coil spring 51 and the breakage of the pinion return coil spring 51 can be prevented. Further, as explained in the embodiment 1, the breakage of the pinion return coil spring 51 resulting from the roll-in can be prevented by the cylindrical portions 52*a*, 53*a*.

Embodiment 5

For the pinion return coil spring 51, a spring that is made of a spring wire having the section formed in a long shape in the direction of outer diameter of the pinion return coil spring 51 is used. In particular, when a spring wire formed in the rectangular section "a" that is long in the direction of outer diameter of the pinion return coil spring 51 is used, the section modulus can be made larger than a circular section even when the sectional area is the same. Therefore, as rigidity of the spring in the radial direction is improved, it becomes possible to suppress the expansion in the radial direction sharply by the centrifugal force and prevent the breakage of the pinion return coil spring 51. In this case, even when the pinion return coil spring 51 wound in the direction differing from the rotating direction of the pinion 3P is used, its breakage can be prevented.

Further, when such the pinion return coil spring 51 is used, it becomes unnecessary to select the winding direction of the pinion return coil spring 51 according to the rotating direction of the starter. That is, regardless of the rotating direction of the starter; clockwise or counterclockwise, it is only needed to provide the pinion return coil spring 51 in one kind of winding direction, either clockwise or counterclockwise, and it becomes possible to standardize component parts.

Accordingly, when the pinion return coil spring 51 (either the clockwise or counterclockwise winding) according to the embodiment 5 is used in the embodiment 1, it becomes possible to minimize the centrifugal force in the overrun state and the breakage of the pinion return coil spring 51 can be prevented. Further, in the embodiment 2, when the pinion return coil spring 51 according to the embodiment 5 is used, it is possible to prevent the expansion of the pinion return coil spring toward the outer portion by the centrifugal force more effectively and the breakage preventing effect of the pinion return coil spring 51 can be further improved.

Embodiment 6

Further, when the first stopper 52 is rusted, the sliding between the first stopper 52 and the pinion 3P becomes worse as mentioned above and the pinion return coil spring 51, the first stopper 52 and the pinion 3P will turn jointly in the overrun state, and the breakage of the pinion return coil spring 51 will be induced. To solve this situation, the first stopper 52 made of a sintered material and impregnated with lubricating oil is used. When a sintered material is used for the first stopper 52 and impregnated with lubricating oil, the rust prevention is improved and the good sliding with the pinion 3P is maintained for a long period. Further, even in the ordinary use other than the overrun state, the sliding with the pinion 3P becomes good by the lubricating action of impregnated lubricating oil and the joint turning of the pinion return coil spring 51 can be prevented.

Figure 5:
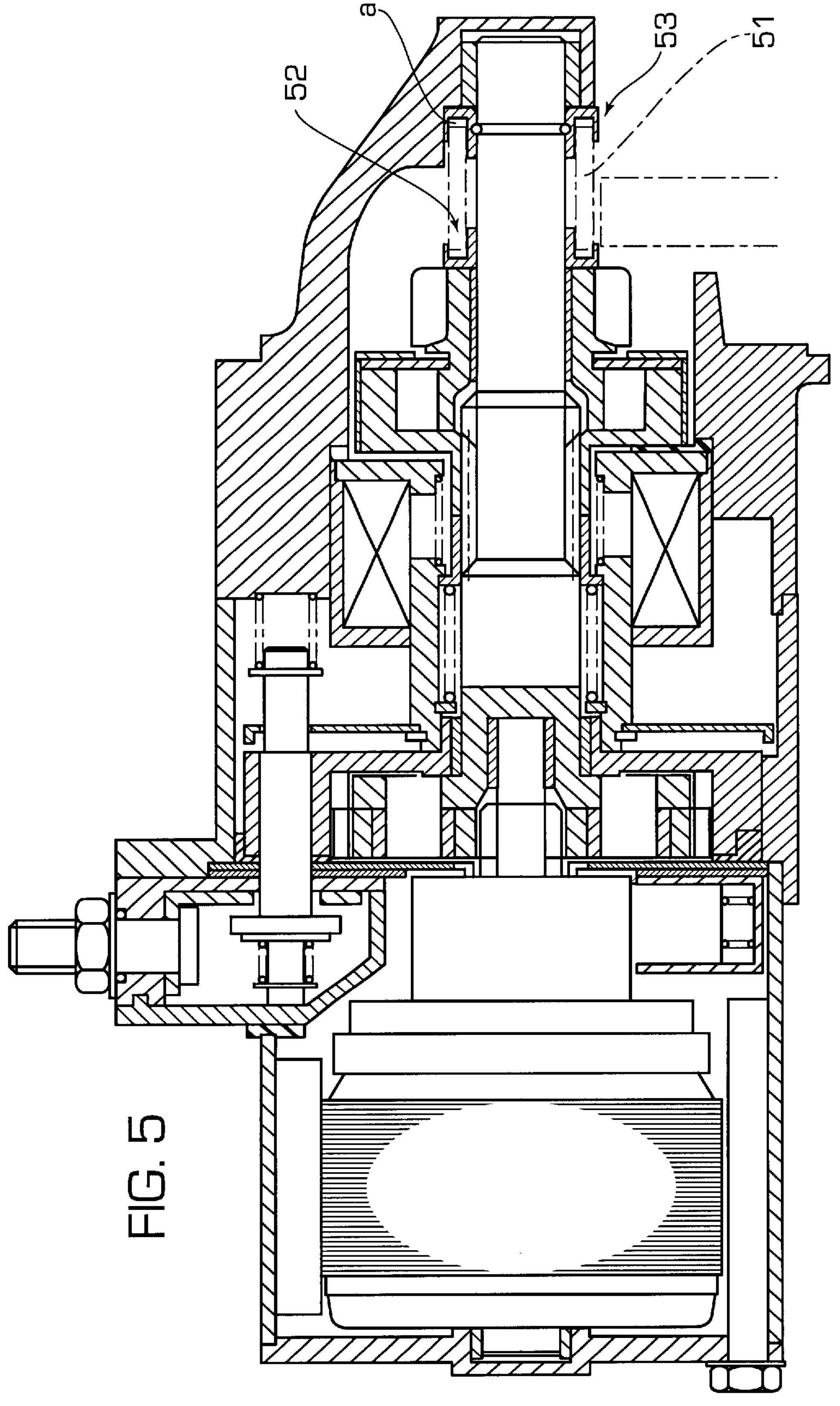
FIG. 5 is a sectional view showing the entire structure of the starter according to an embodiment 5.

When the first stopper 52 according to the embodiment 6 is used, the problem of poor sliding between the pinion 3P and the first stopper 52 is dissolved and the pinion return coil spring 51 does not turn even when the pinion 3P makes the coasting turn. Therefore, when the embodiment 6 is combined with the embodiment 5 shown in FIG. 5, it becomes unnecessary to select the winding direction of the pinion return coil spring 51 according to the rotating direction of a starter and the damage and breakage of the pinion return coil spring 51 can be prevented effectively.

Embodiment 7

Further, the pinion return coil spring 51 is unavoidable to be covered with water to some extent as the ring gear 50 side of the front bracket 20 is open. However, when a pinion return coil spring 51 made of rust preventive material, for instance, stainless steel is used, rust resistance is improved and the spring characteristic is stabilized for a long period of time. Further, as the spring characteristic is stably kept, the pinion return coil spring 51 can be hardly damaged/broken.

Effects of the Invention

As explained above, according to the present invention, as a region is provided to each stopper to restrict the inner diameter side of the pinion return coil spring and control a moving distance of the pinion, damage and breakage of the pinion return coil spring by the roll-in to the inner portion can be prevented and the moving distance of the pinion can be controlled.

Further, as a region is provided to the outer portion of each stopper to restrict the outer diameter of the closely wound portion of the pinion return coil spring, the expansion and breakage of the pinion return coil spring can be prevented.

As one end of the pinion return coil spring that is held by the second stopper is arranged in front of the stop ring, the allowance to the closely fit length of the pinion return coil spring is increased. As a result, the degree of designing freedom is promoted and the breakage of the pinion return coil spring can be minimized.

Further, as the pinion return coil spring in the same winding direction as the rotating direction of the pinion is used, the breakage of the pinion return coil spring by centrifugal force can be prevented.

As a resistance to centrifugal force of the pinion return coil spring is sharply improved by the use of a pinion return coil spring formed with a spring wire which has a long sectional area in the direction of the outer diameter, the breakage of the pinion return coil spring by centrifugal force can be prevented. In this case, it is not necessarily required to make the winding direction of coil of the pinion return coil spring the same as the rotating direction of the pinion. That is, regardless of the rotating direction of a starter; clockwise or counterclockwise, it is only needed to provide a pinion return coil spring of one kind of coil winding direction, clockwise or counterclockwise and therefore, it becomes possible to standardize component parts.

Further, as the first copper is made of an oil impregnated sintered material, sliding of the pinion becomes good, rust resistance is improved and damage and breakage of the pinion return coil spring can be prevented.

In addition, as a pinion return coil spring formed with a rust preventive material is used, rust resistance of the pinion return coil spring is improved and the stabilized spring characteristic can be maintained for a long period of time and the pinion return coil spring is hardly damaged and broken.

What is claimed is:

1. A starter having an output shaft driven by a motor, and a plunger, an exciting coil, and an overrunning clutch coaxially mounted on the output shaft, wherein the motor is driven by exciting the coil to attract the plunger, and the overrunning clutch having a thrust spline connected to the output shaft is moved toward a ring gear to allow a pinion of the overrunning clutch to mesh with the ring gear, thus starting the engine, the starter further having a pinion return coil spring coaxially arranged relative to the output shaft, said spring being compressed when the pinion moves in a direction to mesh with the ring gear and imparting a restoring force to an end of the pinion to return the pinion to an original position thereof when power is no longer supplied to the exciting coil, wherein:

a) the pinion return coil spring is held between a first stopper arranged coaxially relative to the output shaft so as to contact the end of the pinion and slide in the axial direction, and a second stopper coaxially arranged relative to the output shaft at a fixed position of an end thereof, and b) each stopper is provided with a region for restricting an inner diameter of the pinion return coil spring and controlling the movement of the pinion.

2. A starter according to claim 1, wherein each stopper is provided at an outer periphery thereof with a region for restricting an outer diameter of a closely wound coil portion at both ends of the pinion return coil spring.

3. A starter according to claim 1, wherein the second stopper is provided so as not to move in a forward direction of the starter by a stop ring fixed to the output shaft, and one end of the pinion return coil spring held by the second stopper is disposed on a forward side of the starter beyond the stop ring position.

4. A starter according to claim 1, wherein a winding direction of the pinion return coil spring is the same as a rotating direction of the pinion.

5. A starter according to claim 1, wherein a cross section of a spring material of the pinion return coil spring is formed in a long shape in an outer diameter direction thereof.

6. A starter according to claim 1, wherein the first stopper is formed with sintered material impregnated with lubrication oil.

7. A starter according to claim 1, wherein the pinion return coil spring is formed with rust resisting material.

* * * * *